United States Patent
Gotzig

(10) Patent No.: US 11,248,563 B2
(45) Date of Patent: Feb. 15, 2022

(54) CATALYST CHAMBER WITH A CATALYST BED EMBEDDED THEREIN FOR A MONOPROPELLANT THRUSTER OF A ROCKET ENGINE

(71) Applicant: AIRBUS DS GMBH, Taufkirchen (DE)

(72) Inventor: Ulrich Gotzig, Bad Friedrichshall (DE)

(73) Assignee: ARIANEGROUP GMBH, Taufkirchen (DE)

( * ) Notice: Subject to any disclaimer, the term of this patent is extended or adjusted under 35 U.S.C. 154(b) by 787 days.

(21) Appl. No.: 15/225,438

(22) Filed: Aug. 1, 2016

(65) Prior Publication Data

US 2017/0037814 A1 Feb. 9, 2017

(30) Foreign Application Priority Data

Aug. 6, 2015 (EP) ..................................... 15002350

(51) Int. Cl.
*F02K 9/34* (2006.01)
*F02K 9/68* (2006.01)

(52) U.S. Cl.
CPC ................ *F02K 9/34* (2013.01); *F02K 9/68* (2013.01); *F05D 2250/25* (2013.01)

(58) Field of Classification Search
CPC ... F02K 9/68; F02K 9/34; B01J 8/0257; B01J 8/0271; B01J 2208/0084
See application file for complete search history.

(56) References Cited

U.S. PATENT DOCUMENTS 3,156,544 A * 11/1964 Eck .......................... C10G 9/00
48/102 R
2002/0042035 A1* 4/2002 Komiya .............. H01M 8/0631
431/268

(Continued)

FOREIGN PATENT DOCUMENTS

GB 1346848 2/1974
JP 01168332 3/1989

OTHER PUBLICATIONS

European Search Report for EP 15 002 350.5 dated Feb. 11, 2016.
European Office Action for Application No. 15002350.5 dated Apr. 8, 2019.

*Primary Examiner* — Arun Goyal
*Assistant Examiner* — William L Breazeal
(74) *Attorney, Agent, or Firm* — Jenkins, Wilson, Taylor & Hunt, P.A.

(57) ABSTRACT

A catalyst chamber with a catalyst bed embedded therein for a monopropellant thruster of a rocket engine. The catalyst chamber comprises an inlet having a first cross-sectional area through which a propellant can be introduced into the catalyst chamber and an outlet having a second cross-sectional area through which the propellant and/or resulting reaction products can be introduced into a combustion chamber of the thruster. The outlet is connected to the inlet via a catalyst volume of the catalyst chamber. At least one helical wall member is arranged within the catalyst chamber and is dividing the catalyst volume into two or more segments such that an effective length of the catalyst bed of each segment passed through by the propellant and/or its reaction products is larger than a geometrical length of the catalyst chamber defined between the inlet and the outlet along a direction of extension of the catalyst chamber.

16 Claims, 2 Drawing Sheets

(56) References Cited

U.S. PATENT DOCUMENTS

2005/0014641 A1* 1/2005 Gronland ................ B01J 21/04
502/355
2010/0028223 A1* 2/2010 Popham ................ B01J 8/0221
422/187

* cited by examiner

CATALYST CHAMBER WITH A CATALYST BED EMBEDDED THEREIN FOR A MONOPROPELLANT THRUSTER OF A ROCKET ENGINE

CROSS-REFERENCE TO RELATED APPLICATION

This application claims priority to European Patent Application EP 15 002 350.5 filed Aug. 6, 2015, the entire disclosure of which is incorporated by reference herein.

TECHNICAL FIELD

The disclosure herein relates to a catalyst chamber with a catalyst bed embedded therein for a monopropellant thruster of a rocket engine. The disclosure herein further relates to a monopropellant thruster of a rocket engine.

BACKGROUND

Monopropellant thrusters are used in the field of space technology, in both carrier rockets or in different orbital applications. They are manufactured according to the different tasks for a wide range of thrust classes. Such a monopropellant thruster consists essentially of a chamber in which fuel decomposition takes place in a catalyst chamber. In the catalyst chamber a catalyst bed is embedded therein for the fuel decomposition. The decomposition chamber typically consists of a cylindrical housing in which the catalyst chamber is mounted with individual grains or monolithic shape of catalytically active material as catalyst bed. On injection of the propellant, typically a liquid propellant, the fuel is decomposed resulting in a generation of high temperature gases and thus a generation of thrust.

The construction of the catalyst bed of a monopropellant thruster is such that the propellant and the resulting reaction products pass through the catalyst bed axially or radially through one or more stages of the catalyst bed. The design of a substantially cylindrical catalyst bed is dependent, among others, from:

- the absolute length of the catalyst bed in the direction in which the propellant and/or resulting reaction products pass through the catalyst bed;
- the load per cross-sectional area ($\dot{m}/A$) which results from the mass flow rate $\dot{m}$ and the area of the cross-section of the catalyst bed; and
- the load of the catalyst bed per volume ($\dot{m}/V$) which results from the mass flow rate $\dot{m}$, the cross-section and the absolute length of the catalyst bed.

The length of the catalyst bed in the direction in which the propellant and/or resulting reaction products pass through the catalyst bed defines the total necessary space of the catalyst chamber. Furthermore, the absolute length of the catalyst bed defines the loads caused by vibration at a thermal barrier. Hence, it would be desirable to have the absolute length of the catalyst bed as short as possible.

SUMMARY

It is therefore an object of the present disclosure to provide a mechanically and/or functionally improved catalyst chamber with a reduced geometrical length.

This object is solved at least in part or in whole by a catalyst chamber according to features disclosed herein. Preferred embodiments are set out in the dependent claims.

According to the disclosure herein, a catalyst chamber with a catalyst bed embedded therein for a monopropellant thruster of a rocket engine is provided. The catalyst chamber comprises an inlet having a first cross-sectional area through which a propellant can be introduced into the catalyst chamber. Furthermore, the catalyst chamber comprises an outlet having a second cross-sectional area through which the propellant and/or resulting reaction products can be introduced into a combustion chamber of the thruster wherein the outlet is connected to the inlet via a catalyst volume of the catalyst chamber and the catalyst bed, respectively. At least one helical wall member arranged within the catalyst chamber and dividing the catalyst volume into two or more segments is provided such that an effective length of the catalyst bed of each segment passed through by the propellant and/or its reaction products is larger than a geometrical length of the catalyst chamber which is defined between the inlet and the outlet along a direction of extension of the catalyst chamber.

The catalyst chamber according to the disclosure herein enables the reduction of the geometrical length of the catalyst chamber while maintaining the effective length of the catalyst bed compared to a conventional catalyst chamber having no helical wall member. On the other hand, by maintaining the geometric length of the catalyst chamber compared to a conventional catalyst chamber, the effective length of the catalyst bed can be enlarged.

By providing at least one helical wall member within the catalyst chamber and the catalyst bed, respectively, an enlargement of the effective length of the catalyst bed can be realized. Because of the possible reduction of the geometrical length of the catalyst chamber the whole rocket engine can be reduced in its length. Besides a reduced needed volume for the catalyst chamber and the combustion chamber, respectively, the vibration strength or resistance to vibration can be enhanced as well.

According to a preferred embodiment the catalyst chamber has a cylindrical shape having a circular cross-section such that its bases lie in parallel planes. Each of the planes is arranged orthogonal to the direction of extension of the catalyst chamber, wherein the distance of the two planes corresponds to the geometrical length of the catalyst chamber. The cross-section of the bases of the catalyst chamber may correspond to the inlet and the outlet of the catalyst chamber. As a result, the inlet and the outlet have a circular shape or cross-section as well. Alternatively, the inlet and the outlet may lie in the respective planes of the bases of the catalyst chamber but do not necessarily have to capture their whole area. Hence, the cross-section of the inlet and the outlet may differ from a circular shape. However, in this alternative it is preferred that the shape of the inlet and the outlet is concentric to the outer walls defining the catalyst chamber, i.e. having a circular shape or cross-section as well.

The at least one helical wall member may be an insertion element. As such, the at least one helical wall member may be inserted in the catalyst chamber after provision of the latter. Alternatively or additionally the at least one helical wall member may be an integral element of the catalyst chamber. This may be realized by additive manufacturing processes, for example.

The at least one helical wall member may be made from one piece. However, the at least one helical wall member may be composed from several pieces being put together in its axial and/or radial direction. One of the pieces might be an integral part of the catalyst chamber, while another part might be realized as insertion element.

According to a further preferred embodiment, the catalyst chamber may comprise an inner wall being arranged concentrically to an outer wall defining the catalyst chamber. Preferably, the inner wall has a circular shape like the outer wall defining the catalyst chamber. The inner wall may be adapted to receive a heating element for preheating the catalyst bed. Alternatively, the inner wall may comprise at least one further helical wall member arranged within the inner wall and dividing the volume of the inner wall into two or more further segments. The segments (between the inner and the outer wall) and the further segments (within the inner wall) are arranged to be passed through by the propellant and/or its reaction products in parallel. The inner wall, the optional further helical wall member, and the helical wall member may be made of one or more pieces. However, they may be made of several pieces put together during manufacturing of the catalyst chamber.

According to a further preferred embodiment, the segments and/or the further segments are separated from each other. According to this embodiment it is not possible that a propellant passing through one segment flows through an adjacent, different segment. This means, the at least one helical wall does not contain any recesses enabling a connection between adjacent segments of the catalyst bed.

The disclosure herein further provides a monopropellant thruster of a rocket engine which comprises a catalyst chamber according to the description above and below.

BRIEF DESCRIPTION OF THE DRAWINGS

The disclosure herein will be explained more detailed by reference to the accompanying figures.

FIG. 4 shows a perspective view of a third embodiment of a catalyst chamber according to the disclosure herein.

DETAILED DESCRIPTION

Figure 1:
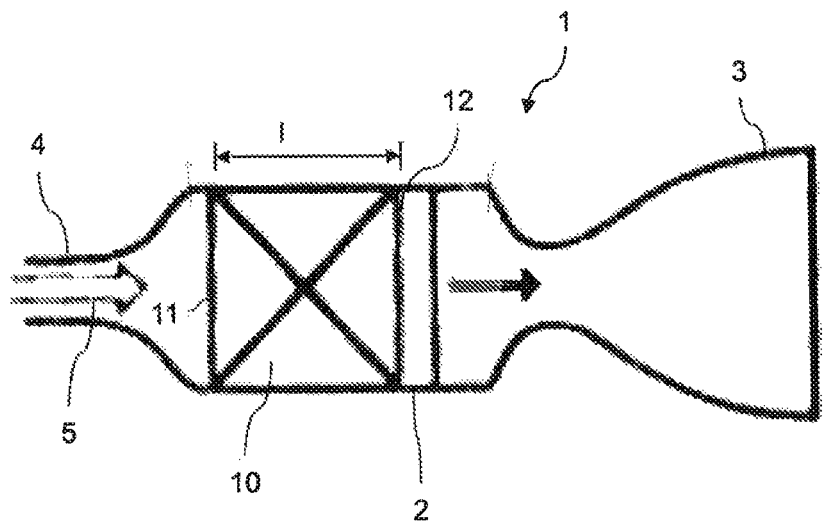
FIG. 1 shows a schematic view of a monopropellant thruster in a cross-section illustrating a catalyst chamber with a catalyst bed embedded therein.

FIG. 1 is a schematic view illustrating a monopropellant thruster 1 of a rocket engine in a cross-section. The thruster 1 comprises a combustion chamber 2, a nozzle 3 and a propellant inlet 4. In the combustion chamber 2 which is arranged in between the propellant inlet 4 and the nozzle 3, a catalyst chamber 10 with a catalyst bed embedded therein is arranged. As indicated by the arrows 5 which illustrate the flow direction of the propellant, the propellant floods into the catalyst chamber 10 at an inlet 11 and passes through the catalyst chamber 10 and the catalyst bed, respectively, in a longitudinal direction of the monopropellant thruster 1. The propellant will be decomposed within the catalyst chamber 10. Resulting reaction products and/or propellant leave the catalyst chamber 10 at outlet 12 and will be introduced into the nozzle 3.

The catalyst chamber 10 has a geometrical length l extending in the longitudinal direction, i.e. parallel to a longitudinal axis, of the thruster 1. In case of a conventional catalyst chamber 10 the catalyst bed of the catalyst chamber 10 is passed through by the propellant and/or resulting reaction products in a direction being parallel to the longitudinal direction of the thruster 1. This means the geometrical length l of the catalyst chamber 10 corresponds to the effective length of the catalyst bed passed through by the propellant and/or its reaction products.

Figure 2:
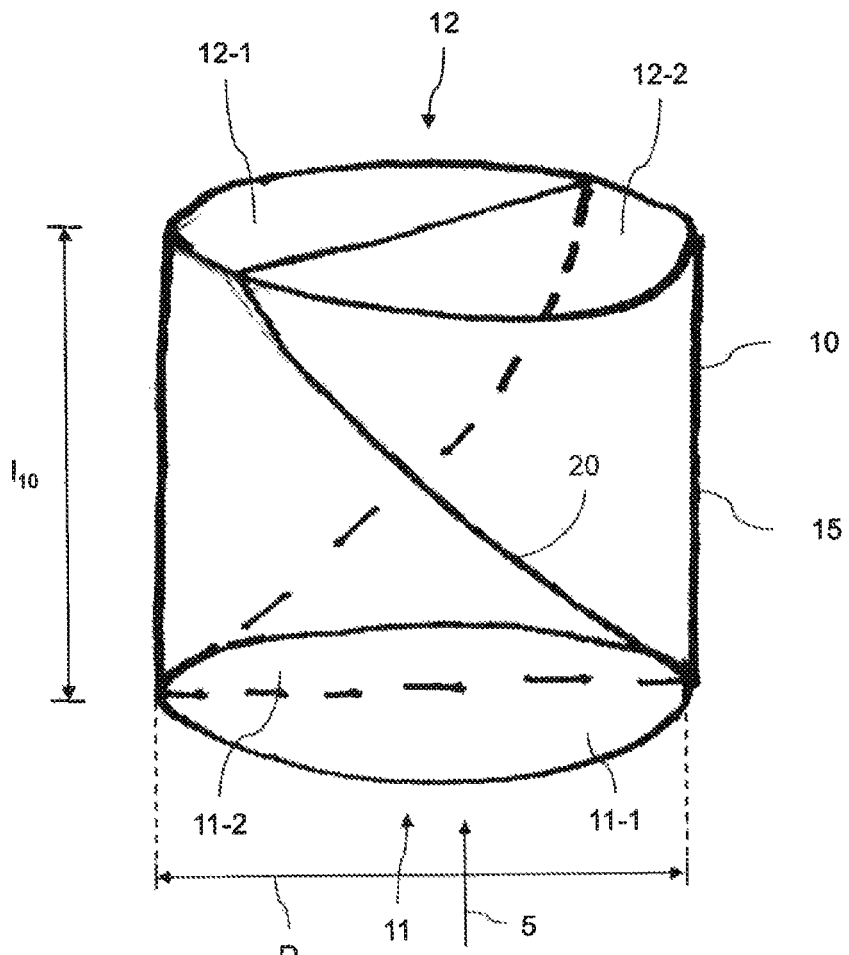
FIG. 2 shows a perspective view of a first embodiment of a catalyst chamber according to the disclosure herein.
Figure 3:
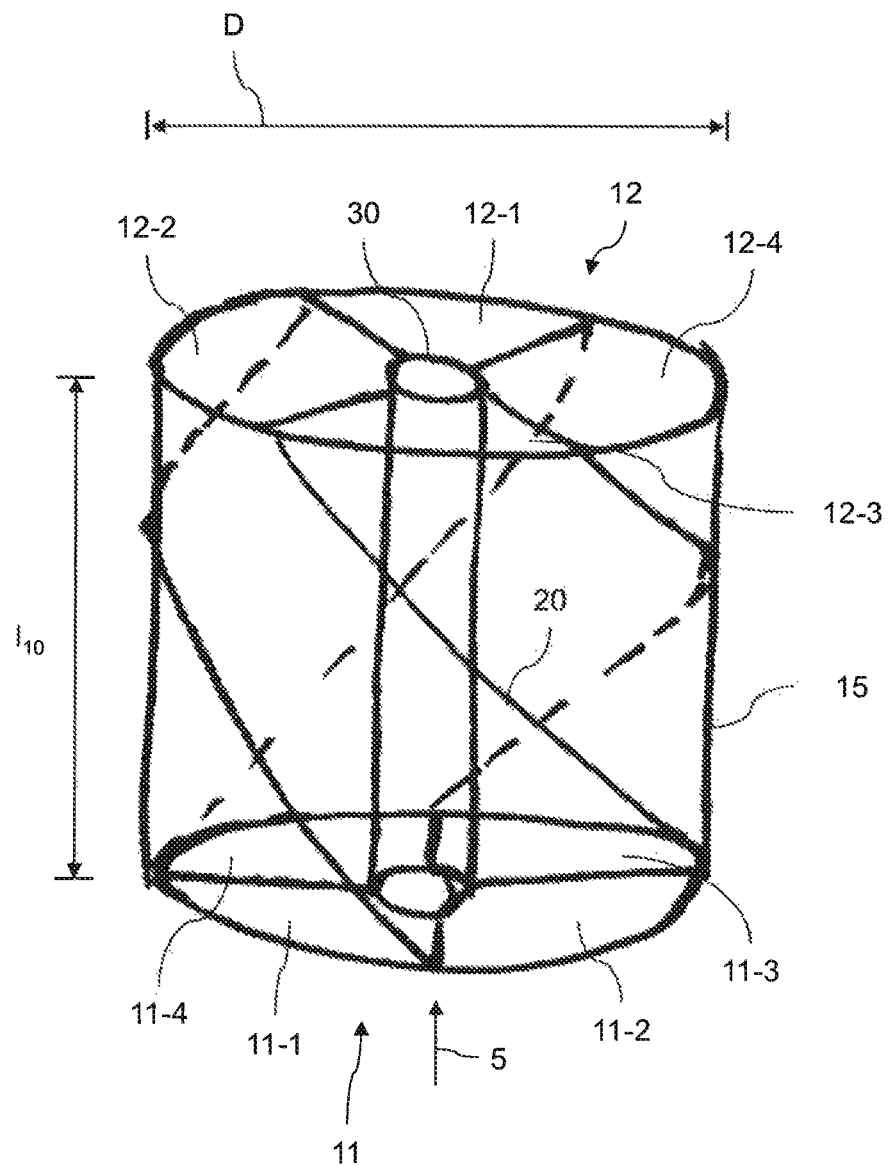
FIG. 3 shows a perspective view of a second embodiment of a catalyst chamber according to the disclosure herein.

FIGS. 2 through 4 show different embodiments of a catalyst chamber 10 according to the disclosure herein in which the geometrical length $l_{10}$ can be reduced while maintaining the effective length of the catalyst bed passed through by the propellant and/or its reaction products as compared to the embodiment in FIG. 1.

According to the perspective views of the different embodiments of FIGS. 2 through 4, the catalyst chamber 10 has a substantially circular shape. It is to be noted that the axial direction of the catalyst chamber 10 and the direction of the propellant flow 5, in the figures, is seen from bottom to top. An outer wall 15 of the catalyst chamber 10 provides the already mentioned circular shape of the catalyst chamber 10. The inlet 11 has a circular cross-sectional area corresponding to the diameter of the catalyst chamber through which the propellant can be introduced into the catalyst chamber 10 and the catalyst bed, respectively. The outlet 12 has a circular cross-sectional area corresponding to the cross-sectional area of the inlet 11 and enables the introduction of the propellant and/or resulting reaction products into the combustion chamber of the thruster. A catalyst volume of the catalyst chamber 10 and the catalyst bed, respectively, is formed in between the inlet 11 and the outlet 12.

The catalyst chamber 10 has a cylindrical shape having a circular cross-section. Its two bases correspond to the inlet 11 and the outlet 12 of the combustion chamber. The inlet 11 and the outlet 12 lie in parallel planes being orthogonal to the direction of extension of the catalyst chamber 10. The direction of extension corresponds to the longitudinal axis of the rocket engine. The distance of the two planes, i.e. the distance between the inlet 11 and the outlet 12, corresponds to the geometrical length $l_{10}$ of the catalyst chamber 10. With reference to the embodiment illustrated in FIG. 2, within the catalyst chamber 10 a helical wall member 20 is arranged. The helical wall member 20 divides the catalyst volume into two segments. An inlet of a first segment is illustrated with 11-1, its outlet is denoted with 12-1. An inlet of the second segment is illustrated with 11-2 while its outlet is denoted with 12-2. Due to the helical shape of the wall member 20 the effective length of the catalyst bed of each of the two segments which is passed through by the propellant and/or its reaction products is larger than the geometrical length $l_{10}$ of the catalyst chamber 10. In case that the geometrical length $l_{10}$ of the catalyst chamber 10 according to the embodiment of FIG. 2 corresponds to the length l of FIG. 1, the effective length of the catalyst bed can be enlarged. On the other hand, if the effective length of the catalyst bed of the catalyst chamber 10 according to the disclosure herein corresponds to the length l of the catalyst chamber 10 of FIG. 1, the geometrical length $l_{10}$ of the catalyst chamber 10 according to the disclosure herein can be reduced.

By controlling the angle of the helical wall member 20 with respect to the direction of propellant flow 5, the effective length of the catalyst bed can be controlled. This angle may be dependent from the diameter D and the cross-sectional area of the inlet 11 and the outlet 12.

FIG. 3 shows a second embodiment, in which the catalyst chamber 10 comprises an inner wall 30 being arranged concentrically to the outer wall 15 of the catalyst chamber 10. Between the inner and the outer walls 15, 30 by way of example four helical wall members are arranged dividing the catalyst volume into four segments. The inlets of the four segments are denoted with 11-1, 11-2, 11-3, 11-4, while the respective outlets are denoted with 12-1, 12-2, 12-3, 12-4.

The inner wall 30 is adapted to receive a not shown heating element for preheating the catalyst bed in the four segments.

In the third embodiment according to FIG. 4, the inner wall 30 comprises a further helical wall member 22 dividing the volume of the inner wall into two further segments instead of a heating element. An inlet of the first segment is denoted with 13-1, its outlet is denoted with 13-2. An inlet of the second further segment is denoted with 14-1, its outlet is denoted with 14-2. The four segments arranged between the inner and the outer wall 15, 30 and the two further segments arranged within the inner wall 30 are passed through by the propellant and/or its reaction products in parallel.

In general, the helical wall member and the further helical wall member 22, respectively, may comprise or consist of one or more pieces. They can be provided as an insertion element or alternatively as an integral element of the catalyst chamber 10. In the latter, the helical wall member 20 may be provided by additive manufacturing methods together with the outer wall 15, for example. In case of the embodiments illustrated in FIGS. 3 and 4, they may be provided as an integral element of the inner wall 30.

The helical wall member 20, 22 can be arranged in one or more catalyst beds which are arranged in the direction of flow of the propellant one behind the other.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST 1 thruster
2 combustion chamber
3 nozzle
4 propellant inlet
5 direction of propellant flow
10 catalyst chamber
11 inlet
11-1 inlet of a first segment
11-2 inlet of a second segment
11-3 inlet of a third segment
11-4 inlet of a fourth segment
12 outlet
12-1 outlet of the first segment
12-2 outlet of the second segment
12-3 outlet of the third segment
12-4 outlet of the fourth segment
13-1 inlet of a first further segment
13-2 inlet of a second further segment
14-1 outlet of the first further segment
14-2 outlet of the second further segment
15 outer wall of the catalyst member
20 helical wall member
22 further helical wall member
30 inner (circular wall)
l geometrical length of the catalyst chamber
$l_{10}$ geometrical length of the catalyst chamber
D diameter of the catalyst chamber

The invention claimed is:

1. A monopropellant thruster embedded in a rocket engine, the monopropellant thruster comprising a catalyst chamber with a catalyst bed, the catalyst chamber comprising:
an inlet having a first cross-sectional area through which a propellant can be introduced into the catalyst chamber;
an outlet having a second cross-sectional area through which the propellant and/or resulting reaction products can be introduced into a combustion chamber of the monopropellant thruster, wherein the outlet is connected to the inlet via a catalyst volume of the catalyst chamber;
an outer wall;
an inner wall spaced apart from and arranged within the outer wall, such that the catalyst volume is subdivided by the inner wall to define an inner volume contained within the inner wall and an outer volume contained between the inner wall and the outer wall; and
at least one helical wall member arranged within the catalyst chamber and extending between the inner wall and the outer wall to divide the outer volume into two or more segments, such that an effective length of a respective portion of the catalyst bed occupied by each segment of the two or more segments passed through by the propellant and/or the resulting reaction products is larger than a geometrical length of the catalyst chamber, which is defined between the inlet and the outlet along a direction of extension of the catalyst chamber;
wherein the catalyst chamber has a cylindrical shape having a circular cross-section, such that bases of the catalyst chamber lie in parallel planes, with each of the parallel planes being orthogonal to the direction of extension of the catalyst chamber, a distance between the parallel planes corresponding to the geometrical length of the catalyst chamber;
wherein a cross-section of the bases of the catalyst chamber corresponds to the inlet and the outlet of the catalyst chamber;
wherein the first cross-sectional area of the inlet is circular and has a first cross-sectional area diameter that corresponds to a diameter of the catalyst chamber; and
wherein the at least one helical wall member covers an entire extension of the inner wall in the direction of extension of the catalyst chamber.

2. The catalyst chamber according to claim 1, wherein the at least one helical wall member is an insertion element.

3. The catalyst chamber according to claim 1, wherein the at least one helical wall member is an integral element of the catalyst chamber.

4. The catalyst chamber according to claim 1, wherein the catalyst chamber comprises an inner wall being arranged concentrically to an outer wall.

5. The catalyst chamber according to claim 4, wherein the inner wall is adapted to receive a heating element for preheating the catalyst bed.

6. The catalyst chamber according to claim 4, wherein the inner wall comprises at least one further helical wall member arranged within the inner wall and dividing the catalyst volume of the inner wall into two or more further segments.

7. The catalyst chamber according to claim 6, wherein the segments and the further segments are arranged to be passed through by the propellant and/or its reaction products in parallel.

8. The catalyst chamber according to claim 1, wherein the segments and/or the further segments are separated from each other.

9. A rocket engine comprising a monopropellant thruster, the monopropellant thruster comprising a catalyst chamber with a catalyst bed embedded therein, the catalyst chamber comprising:
- an inlet having a first cross-sectional area through which a propellant can be introduced into the catalyst chamber;
- an outlet having a second cross-sectional area through which the propellant and/or resulting reaction products can be introduced into a combustion chamber of the monopropellant thruster, wherein the outlet is connected to the inlet via a catalyst volume of the catalyst chamber;
- an outer wall;
- an inner wall spaced apart from and arranged within the outer wall, such that the catalyst volume is subdivided by the inner wall to define an inner volume contained within the inner wall and an outer volume contained between the inner wall and the outer wall; and
- at least one helical wall member arranged within the catalyst chamber and extending between the inner wall and the outer wall to divide the outer volume into two or more segments, such that an effective length of a respective portion of the catalyst bed occupied by each segment of the two or more segments passed through by the
propellant and/or the resulting reaction products is larger than a geometrical length of the catalyst chamber, which is defined between the inlet and the outlet along a direction of extension of the catalyst chamber;
wherein the catalyst chamber has a cylindrical shape having a circular cross-section, such that bases of the catalyst chamber lie in parallel planes, with each of the parallel planes being orthogonal to the direction of extension of the catalyst chamber, a distance between the parallel planes corresponding to the geometrical length of the catalyst chamber;
wherein a cross-section of the bases of the catalyst chamber corresponds to the inlet and the outlet of the catalyst chamber;
wherein the first cross-sectional area of the inlet is circular and has a first cross-sectional area diameter that corresponds to a diameter of the catalyst chamber; and
wherein the at least one helical wall member covers an entire extension of the inner wall in the direction of extension of the catalyst chamber.

10. The monopropellant thruster according to claim 9, wherein the at least one helical wall member is an insertion element.

11. The monopropellant thruster according to claim 9, wherein the at least one helical wall member is an integral element of the catalyst chamber.

12. The monopropellant thruster according to claim 9, wherein the catalyst chamber comprises an inner wall being arranged concentrically to an outer wall.

13. The monopropellant thruster according to claim 12, wherein the inner wall is adapted to receive a heating element for preheating the catalyst bed.

14. The rocket engine according to claim 9, comprising at least one further helical wall member arranged within the inner wall, such that the inner volume of the catalyst chamber is divided into two or more further segments.

15. The monopropellant thruster according to claim 14, wherein the segments and the further segments are arranged to be passed through by the propellant and/or its reaction products in parallel.

16. The monopropellant thruster according to claim 9, wherein the segments and/or the further segments are separated from each other.

* * * * *